(12) United States Patent
Wang

(10) Patent No.: US 7,086,757 B2
(45) Date of Patent: *Aug. 8, 2006

(54) FORMED LIGHTING FIXTURES

(76) Inventor: Jessica Wang, 16F-3, No. 70, Sec. 2, Tun-Hua South Road, Taipei (TW)

(*) Notice: Subject to any disclaimer, the term of this patent is extended or adjusted under 35 U.S.C. 154(b) by 23 days.

This patent is subject to a terminal disclaimer.

(21) Appl. No.: 10/953,899

(22) Filed: Sep. 29, 2004

(65) Prior Publication Data

US 2005/0122717 A1    Jun. 9, 2005

Related U.S. Application Data

(63) Continuation of application No. 10/771,841, filed on Feb. 4, 2004, now Pat. No. 6,830,361, which is a continuation of application No. 10/350,024, filed on Jan. 24, 2003, now Pat. No. 6,719,440.

(51) Int. Cl.
*F21S 6/00* (2006.01)

(52) U.S. Cl. .................. 362/249; 362/252; 362/124; 362/806

(58) Field of Classification Search ........ 362/121–124, 362/244, 249, 252, 806
See application file for complete search history.

(56) References Cited

U.S. PATENT DOCUMENTS

| 4,364,102 | A | * | 12/1982 | Huppert et al. | 362/123 |
|---|---|---|---|---|---|
| 4,462,065 | A |   | 7/1984 | Rhodes | 362/250 |
| 5,250,331 | A | * | 10/1993 | Grefalda | 428/11 |
| 5,379,202 | A |   | 1/1995 | Daun | 362/252 |
| 5,645,343 | A | * | 7/1997 | Rinehimer | 362/252 |
| 5,850,927 | A | * | 12/1998 | Pan | 211/181.1 |
| 5,955,156 | A | * | 9/1999 | Hermanson | 428/7 |
| 6,284,330 | B1 | * | 9/2001 | Hermanson | 428/9 |
| 6,394,282 | B1 | * | 5/2002 | Pan | 211/1.51 |
| 6,413,594 | B1 | * | 7/2002 | Onishi | 428/7 |
| 6,478,164 | B1 | * | 11/2002 | Pan | 211/1.51 |
| 6,652,927 | B1 | * | 11/2003 | Chen | 428/7 |
| 6,682,208 | B1 | * | 1/2004 | Pan | 362/396 |
| 6,769,954 | B1 | * | 8/2004 | Su | 446/353 |
| 2002/0121295 | A1 | * | 9/2002 | Chen et al. | 135/16 |
| 2003/0214809 | A1 | * | 11/2003 | Wong | 362/249 |
| 2004/0100797 | A1 | * | 5/2004 | Yang | 362/123 |

FOREIGN PATENT DOCUMENTS

CN         02272047       10/2003

OTHER PUBLICATIONS

Longwood Gardens-Seasonal Festivals-2000 Christmas, URL=http://www.longwoodgardens.org/SeasonalFestivals/Christmas/2000christmas.htm, download date Nov. 23, 2000, p. 5.

(Continued)

*Primary Examiner*—Ali Alavi
*Assistant Examiner*—Hargobind S. Sawhney
(74) *Attorney, Agent, or Firm*—Seed IP Law Group PLLC

(57) ABSTRACT

An improved formed lighting fixture having a frame, a plurality of bulbs, and a refracting layer, in which the frame is formed by gathering a plurality of rods and profiled in a specific contour, the bulbs are installed on the frame to serve as lighting ornaments, and the rod frame is coated with a refracting layer of a transparent material. A formed lighting fixture so constructed can offer a dazzling effect to thereby reduce bulb amount and facilitate production.

19 Claims, 5 Drawing Sheets

OTHER PUBLICATIONS

ChristmasDepot.com-Outdoor Decorations Topiary Sculptures Menu, URL=http://web.archive.org/web/20020117044252/www.christmaspromotions.com/menu.cgi?S=Outdo. . . , archived as of Jan. 17, 2002.

ChristmasDepot.com-Christmas-Outdoor Decorations-Topiary Sculptures-Standing Deer-3. . . , URL=http://web.archive.org/web/20020118074543/www.christmaspromotions.com/prod.cgi?6904, archived as of Jan. 18, 2002.

ChristmasLights, Etc.-christmas lights, pre-lit artificial christmas trees, outdoor decorations, URL=http://web.archive.org/web/20020121032518/http://www.christmaslightsetc.com/, archived as of Jan. 21, 2002.

Christmas Holiday Decorations by Brite Star, URL=http://web.archive.org/web/20010708003923/www.britestar.com/products.ASP? PID=1620&SID=. . . , archived as of Jul. 8, 2001.

Photographs taken on Nov. 16, 2005, Magicolor 100 Light String Set, Magicolor, Inc., Arlington, Texas, first sold Apr. 13, 2001.

* cited by examiner

FORMED LIGHTING FIXTURES

CROSS-REFERENCES TO RELATED APPLICATIONS

This application is a continuation of U.S. patent application Ser. No. 10/771,841, filed Feb. 4, 2004, now U.S. Pat. No. 6,830,361, which is a continuation of U.S. patent application Ser. No. 10/350,024, filed Jan. 24, 2003, issued as U.S. Pat. No. 6,719,440, granted Apr. 13, 2004, which applications are incorporated herein by reference in their entirety.

FIELD OF THE INVENTION

This invention relates generally to formed lighting fixtures, and more particularly, it relates to an improved formed lighting fixture, which creates a dazzling effect through a refracting layer so the lighting fixtures can be made easily and the number of bulbs used can be reduced.

BACKGROUND OF THE INVENTION

In order to heighten a festive atmosphere, formed lighting fixtures made in specific shapes can be displayed. Referring to FIG. 1, a conventional formed lighting fixture is constructed with a frame (A) and a plurality of light tubes (B), in which the frame (A) can have a specific appearance and be comprised of a plurality of rods, while the light tubes (B) are tangled on and along the entire skeleton such that the frame (A) could serve as a lighting ornament.

In a conventional formed lighting fixture, the bulb in the light tube (B) is operated to emanate light; however, the light either is not refracted or is refracted poorly through the tube wall. Therefore, an object of this invention is to enhance the dazzling phenomenon with fewer bulbs to thereby save power and energy compared with the conventional fixture.

SUMMARY OF THE INVENTION

The primary objective of this invention is to provide an improved structure of formed lighting fixtures for eliminating the defects as mentioned in the conventional fixture.

In order to realize this objective, the structure of formed lighting fixtures of this invention is constructed with a frame, a plurality of bulbs, and a refracting layer, in which the frame can be formed by gathering a plurality of rods and profiled in a specific contour (e.g., a Christmas tree, a Santa Claus, or an elk, etc.). The bulbs can then be installed on the frame to serve as lighting ornaments. The frame is then coated with a layer of transparent refracting material (such as plastic, acrylic, PVC, or glass or another vitreous material).

The advantages and features of this invention could be summarized as the following:

1. By coating a refracting layer on the frame, the light from the bulbs can be refracted to produce a dazzling effect;
2. Reduced cost and energy savings can be appreciated by reducing the number of bulbs; and
3. As the refracting layer can be formed by fusing the coating material onto the frame, the job can be done easily and rapidly independent of the formation of the frame.

For more detailed information regarding advantages or features of this invention, at least an example of a preferred embodiment will be fully described below with reference to the enclosed drawings.

BRIEF DESCRIPTION OF THE DRAWINGS

The drawings discussed in the detailed description of this invention are described briefly as follows, in which.

DETAILED DESCRIPTION OF THE INVENTION

The detailed description of some preferred embodiments is made below with reference to the enclosed drawings.

Figure 1:
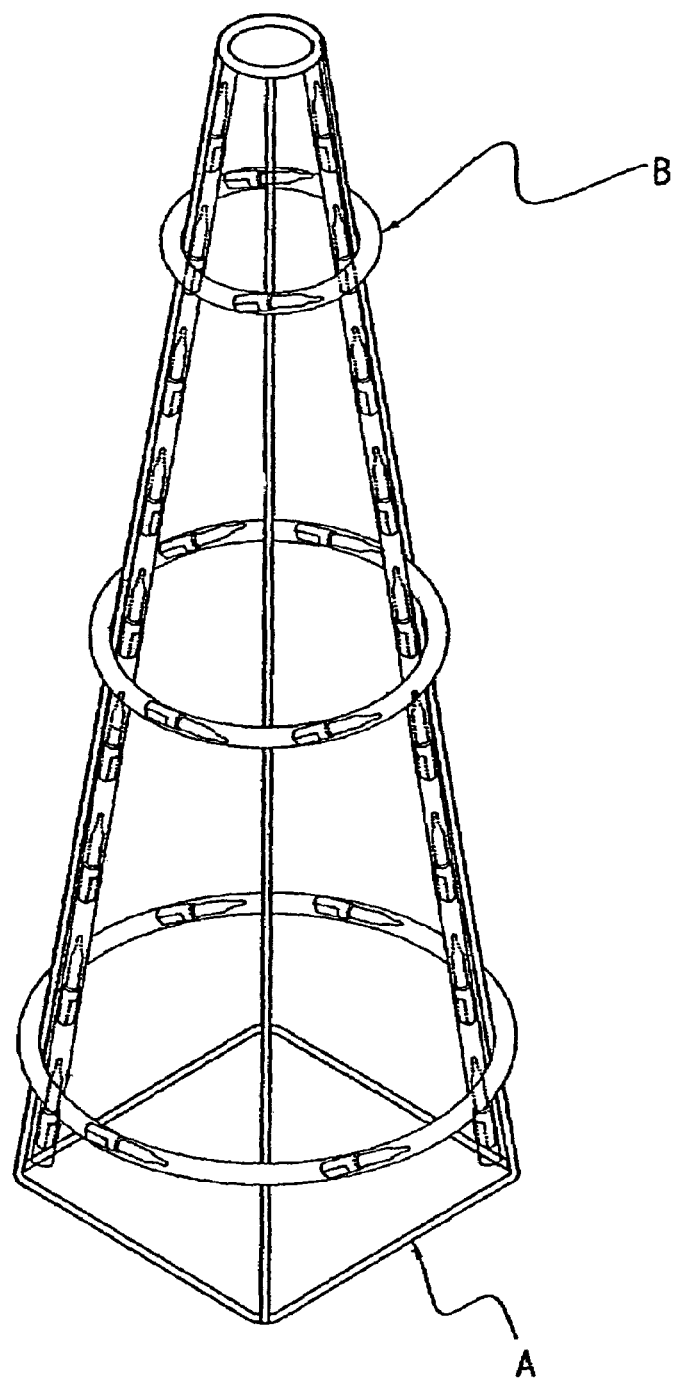
FIG. 1 is a perspective view of a conventional formed lighting fixture, according to the prior art.
Figure 2:
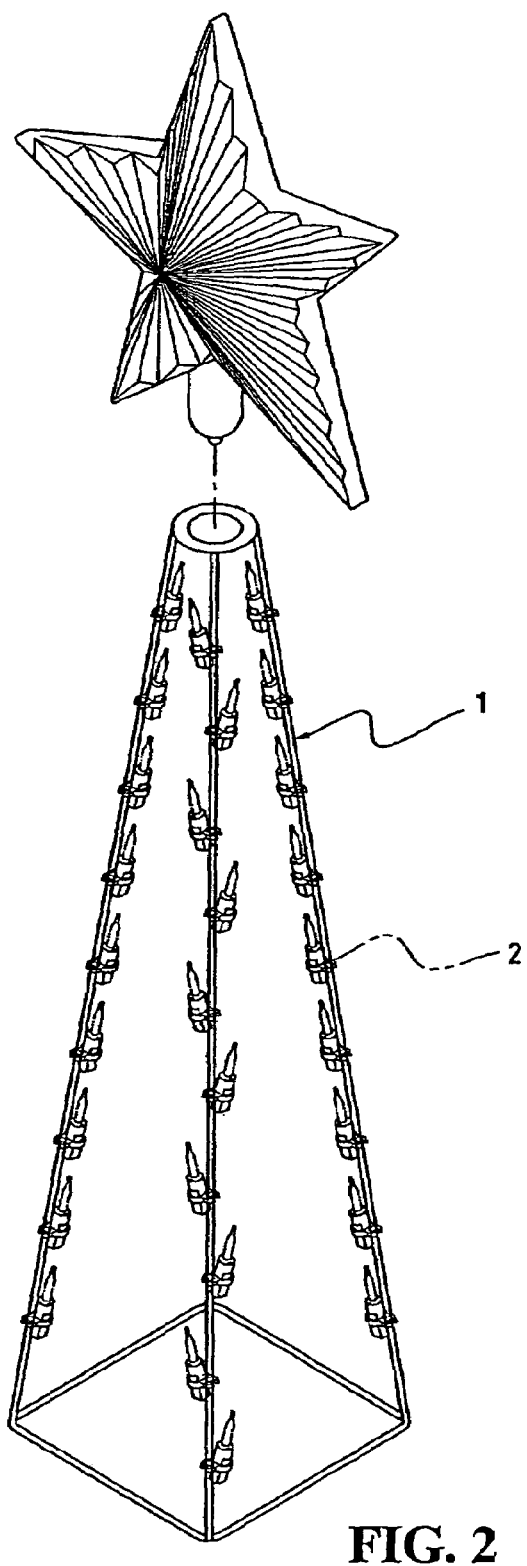
FIG. 2 is a perspective view of a lighting fixture of this invention, without the refractive coating layer.
Figure 3:
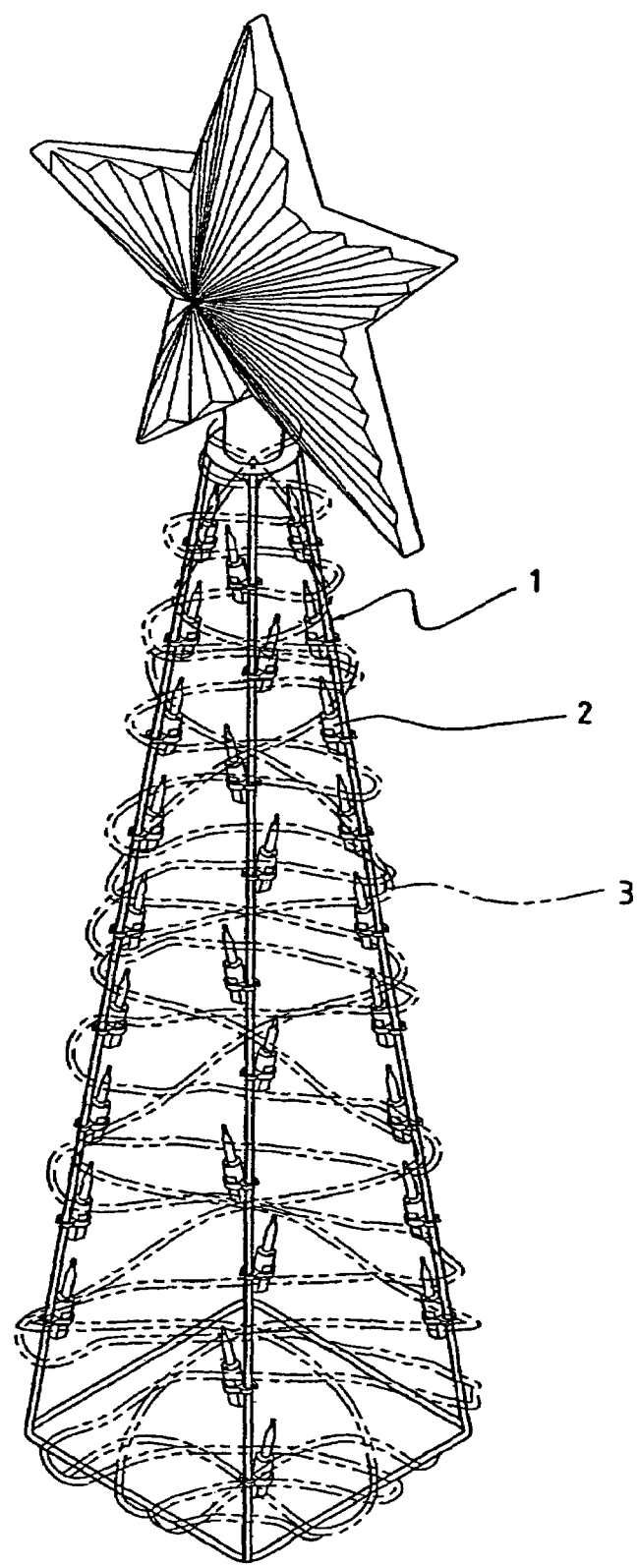
FIG. 3 is a perspective view of the lighting fixture of this invention, coated with a refracting layer.

Referring to FIGS. 2 and 3, according to a preferred embodiment of this invention, the formed lighting fixture is comprised of a frame (1), a plurality of bulbs (2), and a refracting layer (3).

The frame (1) illustrated in FIGS. 2 and 3 is substantially a quadrangular tapered skeleton made by aggregating a plurality of rods. The plurality of bulbs (2) are disposed scatteringly on the ribs of the frame (1) and serve as the fixture's light source, and the refracting layer (3) is made of a transparent material and is coated on the rod frame (1).

The refracting layer (3) can be either a transparent vitreous material or a plastic material, such as PVC or acrylic.

Moreover, the illustrated refracting layer (3) made of a transparent material is specifically tinted and patterned.

Figure 4:
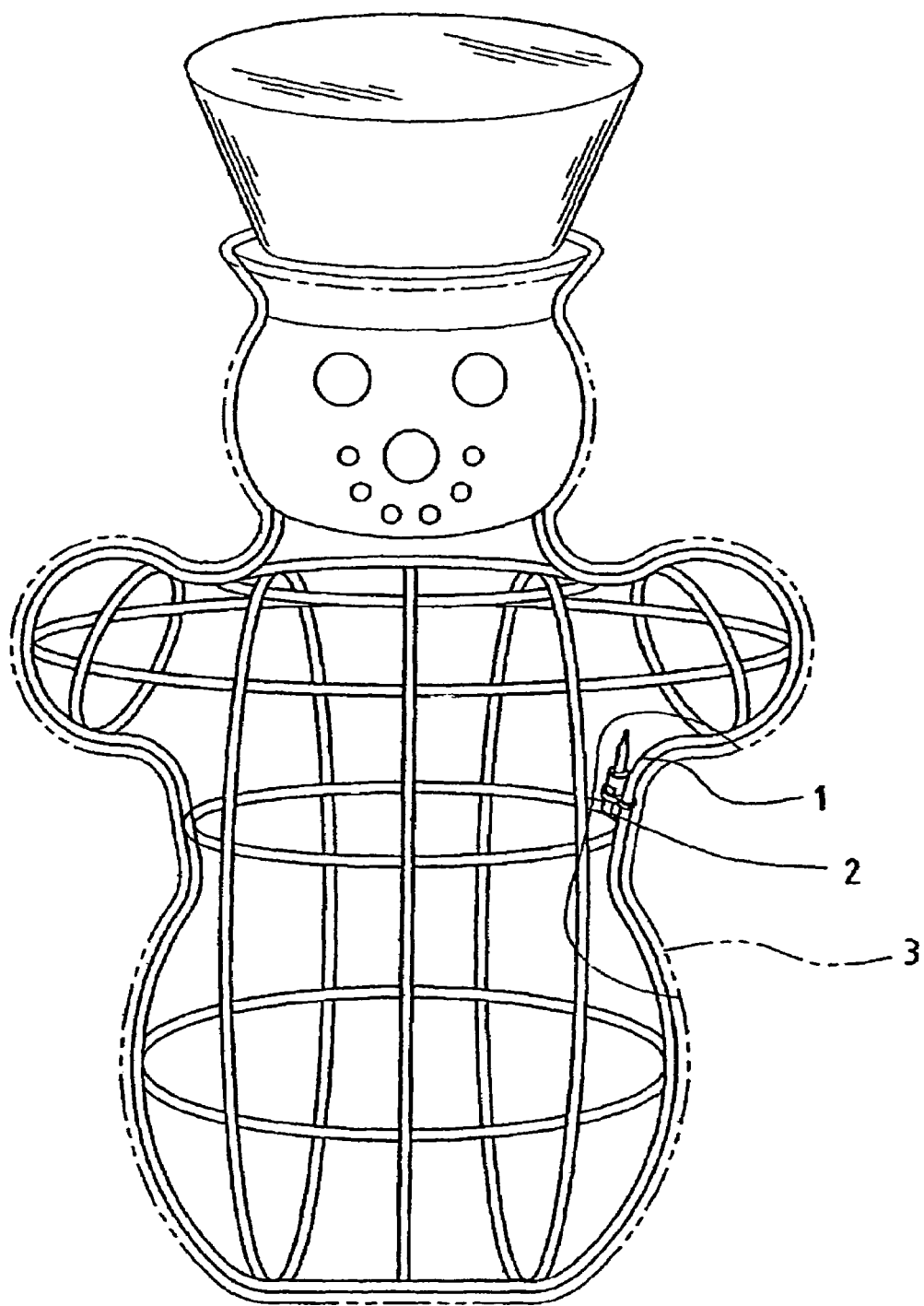
FIG. 4 is a perspective view of a lighting fixture according to another embodiment of this invention.
Figure 5:
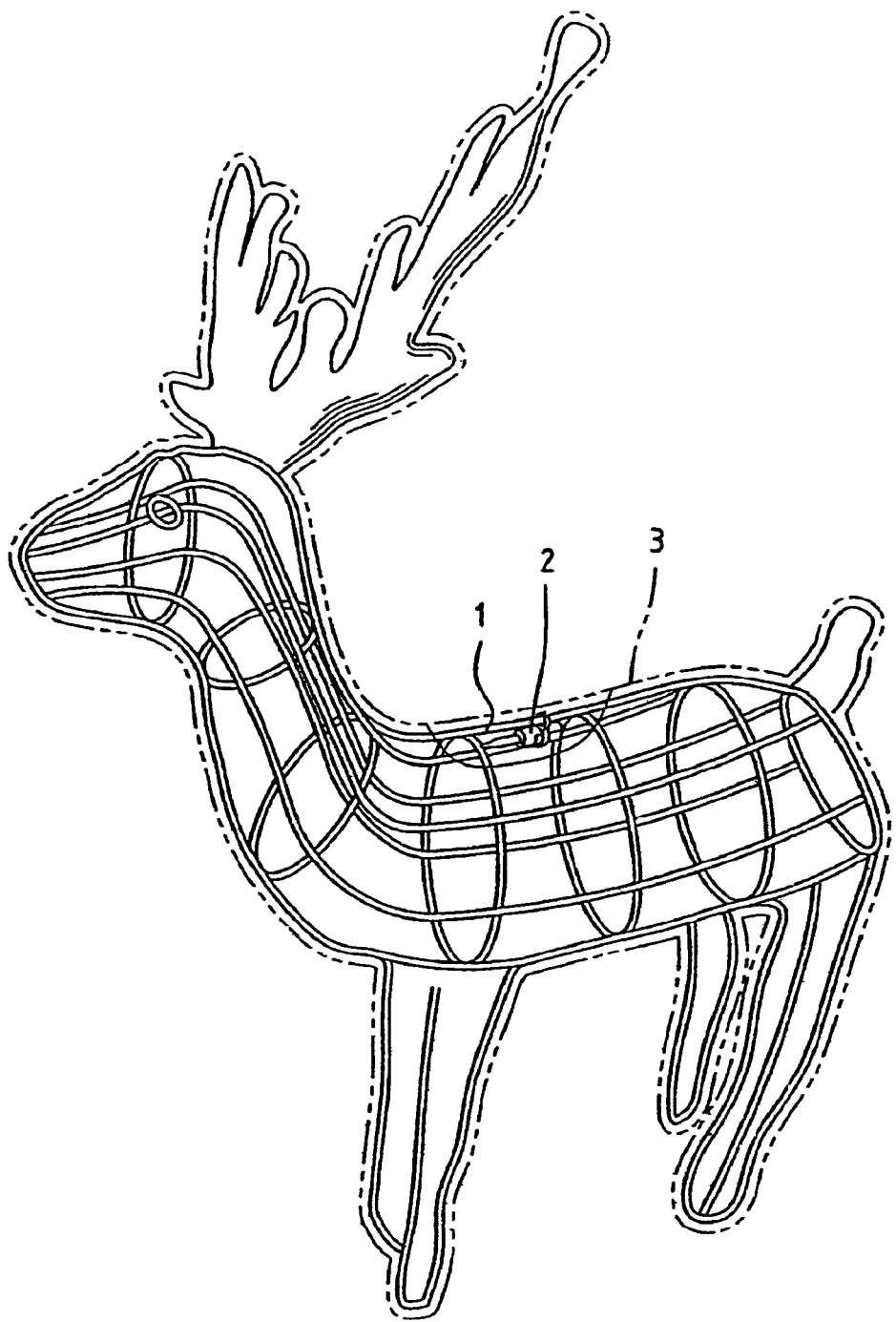
FIG. 5 is a perspective view of a lighting fixture according to yet another embodiment of this invention.

According to another embodiment of the formed lighting fixtures of this invention, shown in FIGS. 4 and 5, the frame (1) is profiled in a snowman or an elk by combining a plurality of molded rods provided with a plurality of bulbs (2) and coated with a refracting layer (3). In FIGS. 3 and 4, the refracting layer is represented by centerlines for clarity. Thus, it would be understood by one of ordinary skill in the art, having reviewed this entire disclosure, that the portions of the structures shown in centerline would be covered by a refractive layer similar to that illustrated and described in connection with the embodiment shown in FIG. 2.

The frame (1) of the formed lighting fixtures of this invention is skeletonized and formed into a seasonable and timely formation, such as a Christmas tree, a snowman, or an elk, etc., with selected proper rod or rib material. Then, the bulbs (2) are disposed on the skeleton of the frame (1), and finally, a suitable vitreous or transparent material, such as glass, PVC, or acrylic for example, is fused and distributed scatteringly and randomly on the skeleton of the frame (1) in its thready state to thereby form the refracting layer (3). As a result, a dazzling phenomenon, making the formed lighting fixtures more splendid and elegant, is created when light emitted from the bulbs (2) penetrates into and refracted through the refracting layer (3).

In addition, where the transparent refracting layer (3) is specifically tinted, the formed lighting fixtures would create a more colorful and attractive scene. Further, a specific pattern of colors, for example an ornament on a Christmas tree, a Santa Claus costume, or the stripe or bell of an elk, could be added to the refracting layer (3) to enrich the variations of the formed lighting fixtures.

In the above description, at least one preferred embodiment has been described in detail with reference to the enclosed drawings, and it is apparent that numerous changes or modifications may be made without departing from the true spirit and scope thereof, as set forth in the claims below.

What is claimed is:

1. A decorative lighting fixture comprising a frame having structural elements adapted to create a desired shape, a plurality of lighting elements spaced about and coupled to the frame, and at least one elongated thread of light-refracting material wrapped around portions of the frame such that some of the light from the lighting elements is refracted as it exits the fixture, creating a desired lighting effect.

2. The lighting fixture of claim 1 wherein the light-refracting material comprises plastic.

3. The lighting fixture of claim 1 wherein the light-refracting material is tinted to add color to the lighting fixture.

4. The lighting fixture of claim 1 wherein the light-refracting material is thready.

5. The lighting fixture of claim 1 wherein the light-refracting material is tinted differently in different locations on the frame to create a colored pattern on the lighting fixture.

6. The lighting fixture of claim 1 wherein the light-refracting material is transparent.

7. The lighting fixture of claim 1 wherein the desired shape is an animal.

8. The lighting fixture of claim 1 wherein the desired shape is a plant.

9. The lighting fixture of claim 1 wherein the light-refracting material is in the form of at least one elongated length of material being distributed about the frame.

10. The lighting fixture of claim 1 wherein the light-refracting material does not cover the entire frame.

11. The lighting fixture of claim 1 wherein the light-refracting material is fused to the frame.

12. A method for making a lighting fixture, comprising forming a frame, coupling bulbs to the frame, and wrapping at least one elongated thread of light-refracting material about at least a portion of the frame a light-refracting material about the frame over the frame.

13. The method of claim 12 wherein distributing the light-refracting material comprises scattering the refracting material about the frame.

14. The method of claim 12 wherein distributing the light-refracting material comprises randomly distributing the refracting material about the frame.

15. The method of claim 12 wherein distributing the light-refracting material comprises threading the refracting material to the frame.

16. A decorative lighting fixture comprising:
    a frame of structural elements that combine to create a desired shape;
    a plurality of lighting elements spaced about at least a portion of the frame; and
    a thread of a refractive material extending between at least some of the structural elements of the frame such that some of the light emitted by the lighting elements during operation of the fixture passes through at least some of the refractive material and is refracted as it exits the fixture.

17. The decorative lighting fixture of claim 16 wherein the lighting elements are attached directly to the structural elements of the frame.

18. The decorative lighting fixture of claim 16 wherein the refractive material is tinted.

19. The decorative lighting fixture of claim 16 wherein light can pass through the refractive material at any location.

* * * * *